B. F. Merrill,
Key-Hole Gage,
No. 80,649. Patented Aug. 4, 1868.
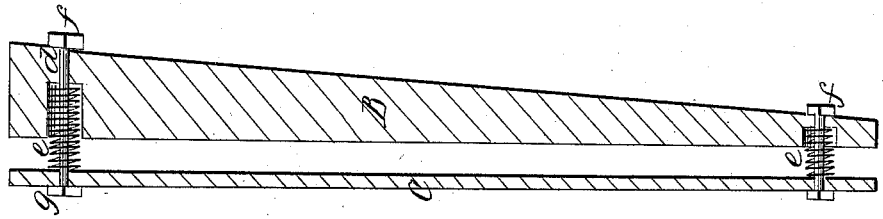
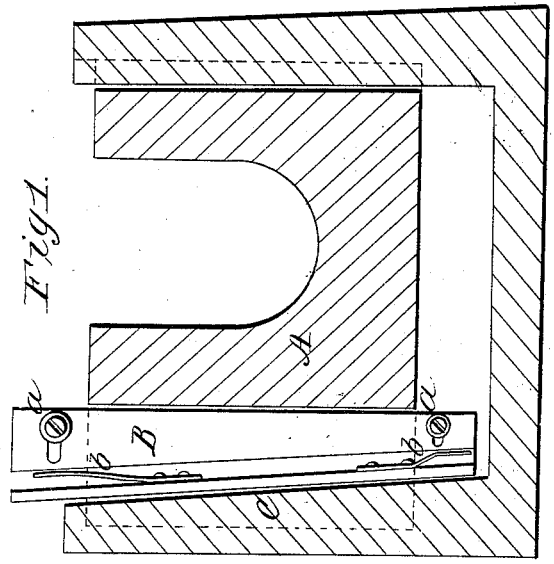
Witnesses:
W. C. Ashketter
Wm A Morgan
Inventor
B. F. Merrill
per
Attorneys

United States Patent Office.

BENJAMIN F. MERRILL, OF WEST LEBANON, NEW HAMPSHIRE.

Letters Patent No. 80,649, dated August 4, 1868.

IMPROVEMENT IN GAUGES.

The Schedule referred to in these Letters Patent and making part of the same.

TO ALL WHOM IT MAY CONCERN:

Be it known that I, BENJAMIN F. MERRILL, of West Lebanon, in the county of Grafton, and State of New Hampshire, have invented a new and useful Improvement in Gauges for measuring key-holes; and I do hereby declare that the following is a full, clear, and exact description thereof, which will enable others skilled in the art to make and use the same, reference being had to the accompanying drawings, forming part of this specification, in which—

Figure 1 represents my improved gauge, applied in what may be considered a key-hole in a block of wood.
Figure 2 represents another form of constructing the same.
Similar letters of reference indicate like parts.

The nature of my invention relates to improvements in gauges for measuring key-holes in machinery, when keys, or gibs and keys, are to be fitted, whereby the size and shape of the keys may be accurately ascertained, to facilitate the fitting of the key; and it consists in a gauge, made of two pieces of wood or metal, united together by any adjustable connection, the general form of which, when so united, resembles, to some extent, a key, as ordinarily constructed, for securing a wheel to a shaft, or the parts of a connecting-rod and cap together, which may be inserted in a key-hole, and adjusted to the proper angle to fit the two inclined sides of the same, when the parts may be secured in that position, and removed from the key-hole, after which the measurement may be readily taken to form the key to fit the said hole.

A represents a block, having a tapered hole through it, similar in shape to key-holes in metal, for securing large wheels to shafts, or for connecting the cap to the end of a steam-engine connecting-rod, with my improved gauge inserted in it.

B represents a tapered strip, of either metal or wood, as may be desired, provided with slots near each end for the set-screws $a\ a$.

C represents another tapered strip, provided with a right-angled projection on one edge.

$b\ b$ represent springs, secured to the inner side of the projecting part of the strip C, which bear at their free ends against the inner edge of the strip C.

$a\ a$ represent set-screws, passing through the slots in the part B, and screwing into the face of the part C, holding the two parts together.

The part B may also be provided with a right-angular projection on its outer edge, whereby, when the two parts are joined together, they present an appearance of uniform thickness throughout their breadth, or nearly so.

When a gauge of this construction is inserted within a key-hole, the springs $b\ b$ will spread the parts B and C apart, so as to press their outer edges fairly against the tapered walls of the key-hole. The set-screws $a\ a$ may then be tightened up, and on taking the gauge out of the hole, it will represent the proper size and taper for the key, from which the key may be readily and accurately made, as will be understood without further description.

Fig. 2 represents another form of constructing a gauge on the same principle.

In this instance, the bolts $d\ d$ pass entirely through the parts B and C, which are forced apart by the spiral springs $e\ e$ bearing against the side of one strip, and the bottom of a socket in the other around the bolt-hole, whereby, when this gauge is inserted in a key-hole, the nuts $f\ f$ may be tightened upon the bolts until they bear firmly against the edge of the strip or part B, when, on taking it out, it will in like manner indicate the size and taper of the key to be fitted.

Various other modes of connecting the two parts, and securing them, may be adopted, without departing from the spirit of my invention.

Having thus described my invention, I claim as new, and desire to secure by Letters Patent—

An adjustable measure for key-holes, consisting of the strips B C, adapted to be forced apart by the action of springs, and clamped in the desired position by means of set-screws or nuts, substantially as herein shown and described.

BENJAMIN F. MERRILL.

Witnesses:
W. P. BURTON,
JOHN WOOD.